ated Patent [19]

United States Patent [19]

Bitar et al.

[11] Patent Number: 5,781,105
[45] Date of Patent: Jul. 14, 1998

[54] LIGHT MANAGEMENT SYSTEM FOR A VEHICLE

[75] Inventors: Sami Bitar, Ann Arbor; Bahman Samimy, Inkster; John David Russell, Farmington Hills; Kevin Michael Glass, Ann Arbor; Marie Therese-Brodner Malecki, Novi; Timothy Lino Cardanha, Ann Arbor, all of Mich.

[73] Assignee: Ford Motor Company, Dearborn, Mich.

[21] Appl. No.: 831,589

[22] Filed: Apr. 9, 1997

[51] Int. Cl.$^6$ .................................................. B60Q 1/26
[52] U.S. Cl. .......................... 340/468; 340/469; 340/438; 340/439
[58] Field of Search ............................ 340/468, 469, 340/438, 439, 435; 701/49, 1; 307/10.1, 10.8; 362/61

[56] References Cited

U.S. PATENT DOCUMENTS

| 4,768,135 | 8/1988 | Kretschmer et al. | 362/61 |
| 4,858,080 | 8/1989 | Oikawa | 362/61 |
| 5,036,437 | 7/1991 | Macks | 362/61 |
| 5,149,187 | 9/1992 | Matsuno et al. | 362/80 |
| 5,562,336 | 10/1996 | Gotou | 362/37 |

FOREIGN PATENT DOCUMENTS

4035956-A  11/1990  Germany.

*Primary Examiner*—Jeffery A. Hofsass
*Assistant Examiner*—Sihong Huang
*Attorney, Agent, or Firm*—Steven A. Maynard

[57] ABSTRACT

A light management system for an automotive vehicle includes vehicle sensors that collectively represent a state of the vehicle and that provide a state of the vehicle signal, vehicle sensors that collectively represent a state of the environment and that provide a state of the environment signal, a microprocessor controller which receives both the state of the vehicle signal and the state of the environment signal, the microprocessor controller provides a modified beam pattern based on the state of the vehicle signal and the state of the environment signal and then manipulates the modified beam pattern based on the state of the vehicle signal and the state of the environment signal and then provides a final light distribution signal, and a forward lighting array for receiving the final light distribution signal and illuminating a roadway thereupon.

20 Claims, 2 Drawing Sheets

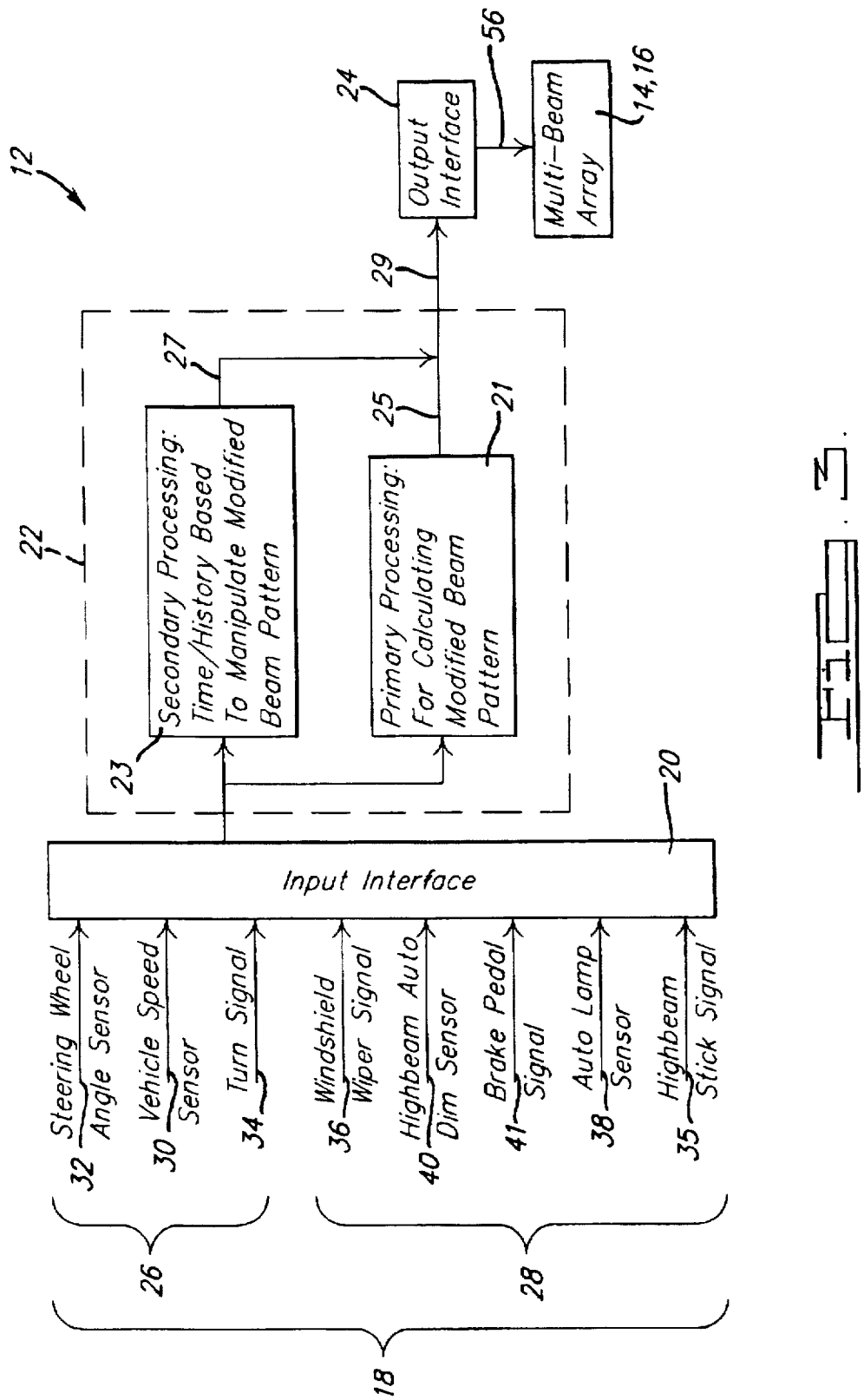

5,781,105

LIGHT MANAGEMENT SYSTEM FOR A VEHICLE

FIELD OF THE INVENTION

The present invention relates to a vehicle light management system, and more specifically, to a light management system which provides a beam pattern via a forward lighting array in response to particular driving conditions.

BACKGROUND OF THE INVENTION

Conventional vehicle lighting systems have addressed the issue of forward lighting in a number of different ways. One system provides an apparatus for adjustably turning the headlights relative to vehicle turning direction. Another system provides sensors which communicate the traffic situation to a microprocessor which then activates a preferred forward light distribution.

One microprocessor controlled vehicle lighting system is disclosed in U.S. Pat. No. 4,841,198. There are a number of problems associated with this patent, one of the problems being relative to the sensing apparatus. An optical element sensor is meant to determine the forward traffic situation via brightness, color and the like. However, depending on the presence of oncoming vehicles, reflected light, overhead streetlights, or ambient light, the system can interpret a traffic situation incorrectly and actuate an undesired instantaneous light output signal. This results in an annoying and hazardous driving situation for both the driver and oncoming traffic.

A further problem resides in the signal processing system. The system employs "a means for comparing the sensed traffic situation with at least one predetermined parameter" for forming a signal which controls the element for changing the light distribution. This system greatly reduces processing flexibility, because for a given set of "predetermined parameters" the computer can only compare the current state of all sensor(s) and respond YES or NO. Therefore, the system light output must be determined through a single comparison which limits flexibility and increases processing demands. Also, the system light output is predetermined. Thus, there are only a limited number of possible light arrangements, each precisely specified and stored in computer memory. In short, the signal processing system is limited to predefined outputs which are dependent on a single comparison. This process places heavy demands on computer memory and processing power.

SUMMARY OF THE INVENTION

Responsive to the deficiencies in the related art, the present invention provides a light management system for an automotive vehicle having: vehicle sensors that provide signals which collectively represent a state of the vehicle, vehicle sensors that provide signals which collectively represent a state of the environment, a microprocessor controller which receives both the state of the vehicle signals and the state of the environment signals, the microprocessor controller provides a modified beam pattern based on the state of the vehicle signals and the state of the environment signals and then manipulates the modified beam pattern based on secondary processing of the state of the vehicle signals and the state of the environment signals and then provides a light distribution signal for a final beam pattern 29, and a forward lighting array for receiving the light distribution signal.

An advantage of the present invention is to provide a light management system which processes the current state of all sensors into a number of independent second level parameters. The second level parameters manipulate the modified beam pattern to provide a desired final beam pattern 29 for a given driving situation. Further, the system provides a smooth transition from one beam pattern to the next.

An object of the present invention is to provide a vehicle lighting system which provides the driver with a desired beam pattern for any given driving condition.

BRIEF DESCRIPTION OF THE DRAWINGS

Other features and advantages of the present invention will become apparent to those skilled in the automotive vehicle lighting arts upon reading the following description with reference to the accompanying drawings, in which:

FIG. 3 is a block diagram of the light management system.

DETAILED DESCRIPTION OF THE PREFERRED EMBODIMENT

Figure 1:
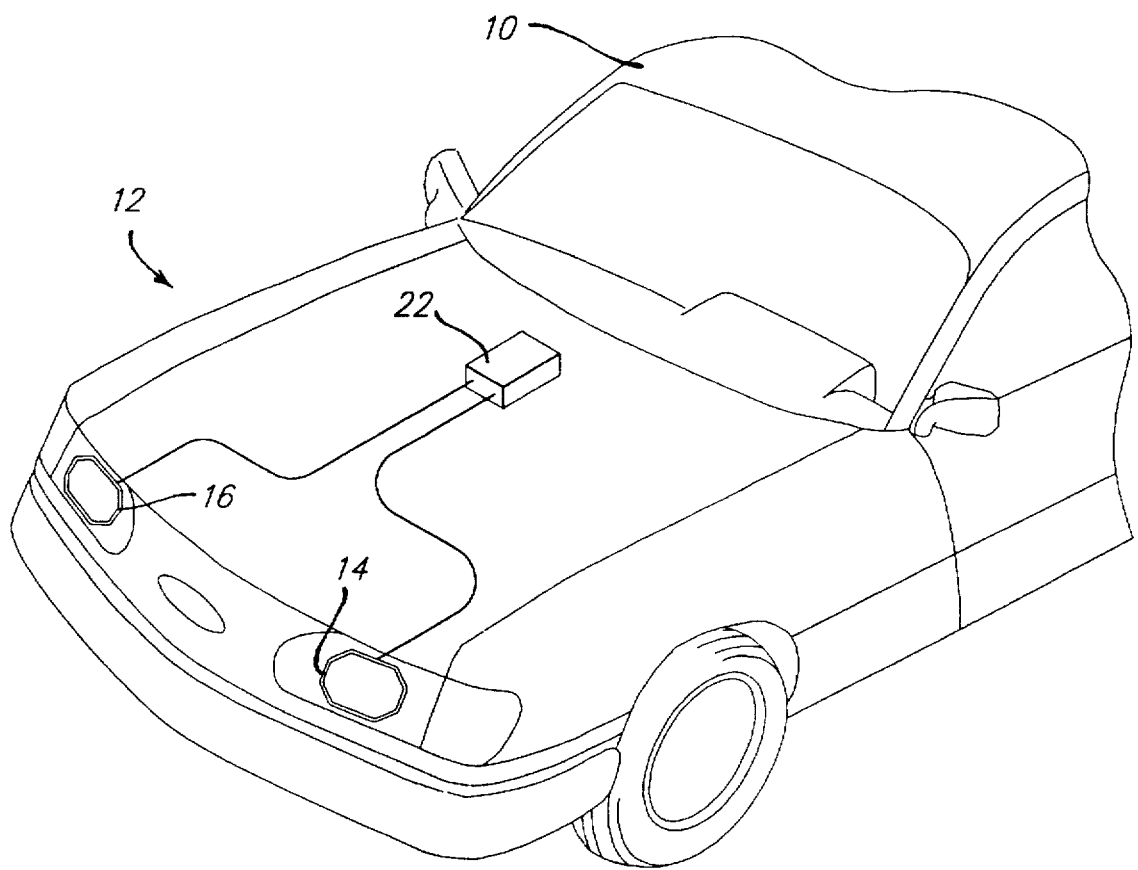
FIG. 1 is a perspective view of an automotive vehicle with a light management system.
Figure 2:
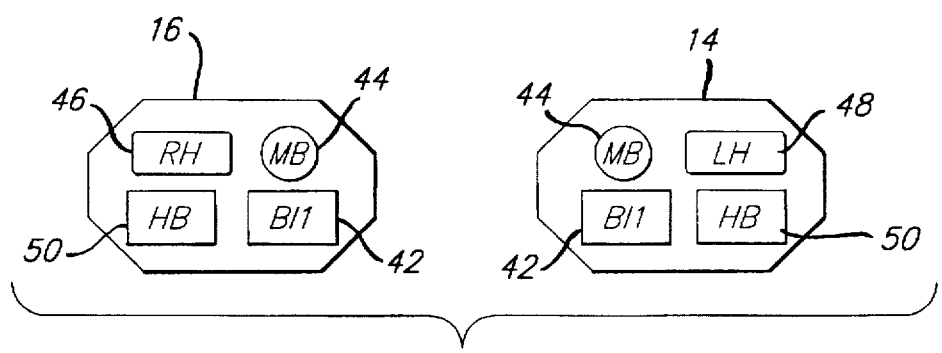
FIG. 2 is a front view of the left and right forward lighting array.

Turning now to the drawings, and in particular to FIGS. 1,2 and 3 thereof, a vehicle 10 is shown having a light management system (LMS) 12 utilizing, in combination, a plurality of vehicle inputs 18, an input interface 20, a microprocessor 22 which utilizes Boolean and fuzzy logic programming, an output interface 24 utilizing a pulse width modulated signal 56, and a left and right forward light array, 14 and 16 respectively.

For the LMS 12, as shown in FIG. 3, to provide an appropriate beam pattern for a given driving condition, the LMS 12 must have inputs describing vehicle driving conditions. The LMS 12 is designed to extract information from various vehicle inputs 18. There are two levels of information which must be derived from the vehicle inputs 18: primary processing information 25 which provides a modified beam pattern based on vehicle condition sensors 26 and environmental condition sensors 28, and secondary processing information 27 which manipulates the modified beam pattern based on vehicle condition sensors 26 and environmental condition sensors 28 to provide a final beam pattern 29. Primary processing 21 is a combination of Boolean logic and if/then strategies. Secondary processing 23 is a combination of fuzzy logic and history based calculations.

As shown in FIG. 3, vehicle condition sensors 26 that the LMS 12 preferably recognize are vehicle speed, change in vehicle direction, and intended vehicle direction. The input used to determine the vehicle speed is a signal from a vehicle speed sensor 30. The nature of the speed signal is a pulse train where the frequency of the pulses is proportional to the speed of the vehicle 10. The LMS 12 takes advantage of the generic vehicle speed sensor 30 that exists on current production vehicles for this input. A steering wheel angle sensor 32 provides information about any instantaneous change in vehicle direction. The steering wheel angle sensor 32 input is sensed preferably by an encoder with standard quadrature output on two channels. Finally, a turn signal 34 yields predictive input regarding the intended vehicle direction. This information will allow the LMS 12 to provide light in the intended direction as the vehicle 10 changes direction.

As also shown in FIG. 3, there are also environmental condition sensors 28 that the LMS 12 preferably utilize. The environmental condition sensors 28 give indications of weather, traffic level, and road type.

One environmental condition sensor 28 is the windshield wiper signal 36. The LMS 12 utilizes the windshield wiper signal 36 as an indication of the absence or presence and approximate amount of rain or snow. Two other environmental condition sensors 28 are the auto lamp and high beam auto dim sensors, 38 and 40 respectively. The auto lamp sensor 38 measures the ambient light level. The auto dim sensor 40 provides a signal when lights from another vehicle are detected as described in U.S. Pat. No. 5,182,502, herein incorporated by reference.

For secondary processing the LMS 12 utilizes both the environmental conditions sensors 28 and vehicle condition sensors 26. An example of secondary processing 23 is when the LMS 12 approximates traffic level by using the brake pedal signal 41 to obtain a value "percent of time braking" along with the current vehicle speed. Another example is when the LMS 12 uses the value "percent time steering" to determine whether the environment is a winding road. This input is derived from the steering wheel angle sensor 32 and is determined by measuring the percent of time that the steering wheel is not in the straight position.

An advantage of the present invention is the way in which primary processing 21 cooperates with secondary processing 23 to produce a desired final beam pattern 29. For example, previous high beam auto dim systems relied solely on the high beam auto dim sensor for automatic dimming of the high beams. The present LMS 12 uses the high beam auto dim sensor 40 and the approximated traffic level to determine whether or not the high beams 50 should be activated. If the LMS 12 determines that the current traffic level is heavy, the high beams 50 will be inhibited.

As further shown in FIG. 3, to allow the microprocessor 22 to gather the input information provided by the vehicle inputs 18 described above, an input interface 20 is provided. The input interface would include A/D converters, counter/timers, digital I/O, and various other input mechanisms as those known in the art. The input information can then be accessed by the microprocessor 22 through a data bus.

The vehicle speed sensor 30 is directly input to one of the counters on the input interface to measure the period of the pulse train. The steering wheel angle sensor 32 can be an encoder which is connected to a quadrature decoding chip as known in the art, for example, a Hewlett-Packard HCTL-2020 quadrature decoding chip. The output of the quadrature decoding chip is a 16 bit binary number representing the number of steps the steering wheel shaft has turned. When the turn signal 34 is used, a pulse train with a frequency equal to that seen by an observer looking at flashing turning lights is created. The sign of the signal, plus or minus, depends on the direction of the turn signal 34. This input is wired to one of the differential A/D channels on the input interface 20.

When the windshield wipers are used a windshield wiper signal 36 is created which is of varying voltage depending on the wiping frequency of the windshield wipers. The high beam auto dim sensor 40 produces a +5V output signal if there are no vehicles detected and a 0V output signal if vehicles are detected. Each of the above signals are wired to one of the differential channels of the input interface 20. The auto lamp sensor 38, the brake pedal signal 41, and the high beam stick signal 35 are on/off signals and are each wired to one of the differential channels of the input interface 20.

To provide the current necessary to power the forward light array, 14 and 16, the signals created by the microprocessor 22 are amplified by a power driver chip as known in the art, for example, a power MOSFET driver chip. Power MOSFET driver chips are preferable because of their high current draw capability, low ON voltage drop, and high bandwidth. All LMS 12 output signals from the microprocessor 22 are triple buffered, first by a very well protected MOSFET driver chip, second by an open collector logic gate, and third by a standard LS gate, which is controlled by the microprocessor 22. The logic and pull-up power used inside the unit is derived from internal linear regulators in a lamp driver module.

As further still shown in FIG. 3, to allow the microprocessor 22 to communicate instructions to the forward light array, 14 and 16, an output interface 24 is provided. The output interface 24 of the LMS 12 produces a pulse width modulated (PWM) signal 56 and has one digital output for resetting the quadrature decoding chip. Utilizing a PWM signal 56 is a technique that capitalizes on the dynamic response of a system. In the case of the LMS 12, the system is the forward light array, 14 and 16 The requirement for the frequency of the PWM signal 56 is derived from the temporal sensitivity of a human's vision system. Human vision can not detect flickering light at frequencies greater than approximately 60 Hz. The preferable frequency of the PWM signal 56 is 200 Hz. The 10 PWM channels are controlled by preferably using independent counter timers.

The LMS 12 uses a multi-source, multi-beam forward light array, 14 and 16, for the output device as shown in FIG. 2. In the array, each beam is designated for a specific purpose. Base beams 42 provide standard illumination of the forward scene at low speeds. Mid beams 44 provide added seeing distance down the road at moderate to high speeds. Right and left spread beams, 46 and 48 respectively, are used to increase the illumination of the objects on the sides of the road still in the forward scene. The right and left spread beams, 46 and 48 respectively, also function independently to illuminate objects immediately in front and to the side of the vehicle 10 when turning. The high beams 50 provide maximum seeing distance down the road at high speeds.

All of the beams are controlled using a PWM signal 56, as shown in FIG. 3. The duty cycle or "percent time on" can be regulated from 0% to 100%. A smooth transition is created by ramping the duty cycle from one value to a second value in a controlled fashion.

The LMS 12 microprocessor 22 utilizes various types of logic to accomplish system objectives. Primary processing 21 as well as some aspects of secondary processing 23 are implemented through a conventional Boolean logic program and if/then decision strategies. The following if/then statements are preferable examples:

if the auto lamp sensor 38 signals a predetermined ambient light level, then the forward light array, 14 and 16, is activated;

if the windshield wiper signal 36 is ON, then the base beams 42 are activated;

if the high beam auto dim sensor 40 detects traffic, then the high beams 50 are off;

if the vehicle speed sensor 30 indicates slow, then the spread beams, 46 and 48, are activated;

if the high beam stick signal 35 is in the ON position, then the high beams 50 are on;

if the steering wheel angle sensor 32 senses a left turn, then the left spread beam 48 is activated;

if the steering wheel angle sensor 32 senses a right turn, then the right spread beam 46 is activated;

if the vehicle speed sensor 30 senses medium or high, then the mid beams 44 are activated;

if the driving condition is city traffic, then inhibit the high beams 50;

if a predetermined number of turns is exceeded within a predetermined period of time, then activate the spread beams, 46 and 48;

if the vehicle speed sensor 30 senses high, then inhibit the spread beams, 46 and 48;

if the left turn signal is ON, then the left spread beam 48 is activated;

if the right turn signal is ON, then the right spread beam 46 is activated;

provide smooth transition when turning a beam on or off;

if there are several transitions in a given time ($t_1$) of the high beam auto dim sensor 40 signal, then inhibit the high beams 50 for time ($t_2$) unless the high beam stick signal 35 is in the ON position;

if a predetermined number of turns is exceeded within a predetermined period of time at slow speeds, then inhibit the high bears 50 unless the high beam stick signal 35 is in the ON position; and monitor the total power consumed by the forward light array, 14 and 16.

Secondary processing 23 utilizes a fuzzy logic program 54, as shown in FIG. 3, to evaluate complex situations where exact cutoff points are not necessarily clear. For example, certain driving conditions are a function of both vehicle speed and steering wheel angle. If the driver is traveling at 45 MPH and is exceeding a predetermined number of back and forth turns within a predetermined period of time, it may be that the driver is on a winding country road and needs both the left and the right spread beams, 46 and 48 respectively, activated.

To illustrate the use of the fuzzy logic program, a sample of preferable rules are listed below. These rules are used to determine if the current driving conditions are busy "city" traffic. This is useful information because the high beams 50 may not be desirable in this type of driving condition. The variables listed below are % time—braking, % time—steering, speed, and city. The percent of time that the brakes have been applied in the last n seconds, where n is a calibratable parameter, is represented by % time—braking. The percent of time that the steering wheel is not in the straight position is represented by % time—steering. Speed represents the vehicle speed and city represents the probability that the current situation is busy "city" traffic.

1. IF % time—braking is med AND speed is slow THEN city is high.

2. IF % time—braking is high THEN city is high.

3. IF % time—braking is med AND speed is NOT slow AND % time—steering is NOT high THEN city is low.

4. IF speed is NOT slow AND % time—braking is med AND % time—steering is high THEN city is high.

5. IF % time—braking is low AND speed is NOT slow THEN city is low.

6. IF speed is slow AND % time—braking is low AND % time—steering is low THEN city is low.

7. IF speed is slow AND % time—braking is low AND % time—steering is NOT low THEN city is high.

8. IF speed is slow THEN city is very high.

Once the LMS 12 logic determines which lights to actuate, several digital filters smooth the transition of the forward light array, 14 and 16. One of these filters is a low-pass, single-pole digital filter shown in Equation 1 below and known to those skilled in the art and suggested by this disclosure. A ramp filter is shown in Equation 2. The filters allow for different light ramping rates to be used to achieve differing effects. For example, the transition from the high beams 50 to the base beams 42 is fast so that the glare to oncoming traffic can be minimized. However, the transition from base beams 42 to high beams 50 is much slower and smoother to minimize annoyance to the driver.

$$y_i = (1-\alpha)x_{i-1} + \alpha y_{i-1} \quad (1)$$

where $\alpha = e^{-\Delta t/RC}$ $1/RC$ = cut-off frequency $X_i$ = input at time i $Y_i$ = output at time i $\Delta t$ = sample time $$y_i = y_{i-1} + \Delta t/t_r|(-1)^{i+1}| \quad (2)$$

where $x_i$ = input at time i $y_i$ = output at time i $\Delta t$ = sample time $t_r$ = total ramp time The following is an example LMS 12 operation in a given vehicle drive pattern. Assuming an initial vehicle speed of 14 mph and a moderate "sweeping" turn, both of the spread beams, 46 and 48, would be on due to the low vehicle speed. The mid beams 44 would be off due to the low vehicle speed.

Vehicle speed then increases steadily. At 2.5 seconds the vehicle speed exceeds the lower limit for the spread beams, 46 and 48, and both of the spread beams, 46 and 48, begin to ramp down according to Equation 1. At 3.5 seconds the vehicle speed exceeds the upper limit for the mid beams 44, and they begin to ramp up in intensity linearly according to Equation 2. The combination of these two actions provides additional light down the road to see further at higher speeds and removes distracting light from the sides.

At 7 seconds, the vehicle enters into a sharp right turn, with the steering angle reaching a maximum value of 32 counts at 11 seconds. This exceeds the upper bound of the right spread beam 46 limit with a steering position of 3 counts at 7.5 seconds, and ramps up the right spread beam 46. This action provides the light necessary to illuminate the road in the area the vehicle 10 is steering towards. As the turn progresses, the driver is forced to lower vehicle speed to maintain control. This causes the speed to drop below the lower speed limit of 26.5 mph, causing the mid beams 44 to ramp back down to an off state.

The plurality of vehicle inputs 18 used in the LMS 12 should be considered as illustrative and not limiting. Other inputs may be utilized to provide information to the LMS 12. Exemplary of such inputs would be fog sensors, rain sensors, and using the ABS wheel signals to determine vehicle direction. Varying the sensory inputs would not depart from the herein described inventive concept of processing various inputs to determine what light pattern is most beneficial.

Only one embodiment of the LMS 12 of the present invention has been described. Those skilled in the automotive lighting arts will appreciate that others may be possible without departing from the scope of the following claims.

We claim:

1. A light management system for an automotive vehicle, comprising:

vehicle sensing means for sensing at least one vehicle condition representing a state of the vehicle and providing a state of the vehicle signal therefor;

environmental sensing means for sensing at least one environmental condition representing a state of the environment and providing a state of the environment signal therefor;

a microprocessor controller for primary processing of said state of the vehicle signal and said state of the environment signal and for providing a modified beam pattern thereby, said microprocessor controller further for secondary processing of said state of the vehicle signal and said state of the environment signal and manipulating the modified beam pattern thereby and providing a light distribution signal for a final beam pattern therefrom; and a forward lighting array for receiving the light distribution signal for a final beam pattern therefrom and illuminating a roadway thereupon.

2. A light management system according to claim 1, further including an output interface for receiving the light distribution signal from said microprocessor controller and communicating a pulse width modulated light distribution signal to said forward lighting array.

3. A light management system according to claim 1, further including an input interface for receiving the state of the vehicle signal and the state of the environment signal and communicating the state of the vehicle signal and the state of the environment signal to said microprocessor controller.

4. A light management system according to claim 1, wherein said forward lighting array is a multi-beam forward lighting array.

5. A light management system for an automotive vehicle, comprising:

vehicle sensing means for sensing a plurality of vehicle conditions collectively representing a state of the vehicle and providing a state of the vehicle signal therefor;

environmental sensing means for sensing a plurality of environmental conditions collectively representing a state of the environment and providing a state of the environment signal therefor;

a microprocessor controller for primary processing of said state of the vehicle signal and said state of the environment signal and for providing a modified beam pattern thereby, said microprocessor controller further for secondary processing of said state of the vehicle signal and said state of the environment signal and manipulating the modified beam pattern thereby and providing a light distribution signal for a final beam pattern therefrom;

an output interface for receiving said light distribution signal for a final beam pattern from said microprocessor controller and communicating a pulse width modulated light distribution signal therefrom; and a multi-beam forward lighting array for receiving the pulse width modulated light distribution signal from said output interface and illuminating a roadway thereby.

6. A light management system according to claim 5, further including an input interface for receiving said state of the vehicle signal and said state of the environment signal and communicating said signals to said microprocessor controller.

7. A method for providing a forward light distribution for an automotive vehicle, comprising the steps of:

sensing at least one vehicle condition representing a state of the vehicle;

sensing at least one environmental condition representing a state of the environment;

establishing a modified beam pattern based upon the state of the vehicle and state of the environment;

manipulating the modified beam pattern based upon the state of the vehicle and the state of the environment to produce a final beam pattern;

providing a signal for a forward light distribution based upon the final beam pattern; and illuminating a forward lighting array using pulse width modulation upon receiving the signal for a forward light distribution.

8. The method as defined in claim 7, wherein said step of sensing at least one environmental condition representing a state of the environment is carried out with an auto lamp sensor; and if the auto lamp sensor signals a predetermined ambient light level, then:
activating said forward lighting array.

9. The method as defined in claim 7, wherein said step of sensing at least one environmental condition representing a state of the environment is carried out with a windshield wiper signal; and if the windshield wiper signal is ON, then:
activating a plurality of base beams of said forward lighting array.

10. The method as defined in claim 7, wherein said step of sensing at least one environmental signal representing a state of the environment is carried out with a high beam auto dim sensor; and if the high beam auto dim sensor detects traffic, then:
deactivating a plurality of high beams of said forward lighting array.

11. The method as defined in claim 7, wherein said step of sensing at least one vehicle condition representing a state of the vehicle is carried out with a vehicle speed sensor; and if the vehicle speed sensor indicates slow, then:
activating a plurality of spread beams of said forward lighting array.

12. The method as defined in claim 7, wherein said step of sensing at least one vehicle condition representing a state of the vehicle is carried out with a steering wheel angle sensor; and if the steering wheel angle sensor senses a left turn, then:
activating a left spread beam of said forward lighting array.

13. The method as defined in claim 7, wherein said step of sensing at least one vehicle condition representing a state of the vehicle is carried out with a steering wheel angle sensor; and if the steering wheel angle sensor senses a right turn, then:
activating a right spread beam of said forward lighting array.

14. The method as defined in claim 7, wherein said step of sensing at least one vehicle condition representing a state of the vehicle is carried out with a vehicle speed sensor; and if the vehicle speed sensor senses medium or high, then:
activating a plurality of mid beams of said forward lighting array.

15. The method as defined in claim 7, wherein said step of sensing at least one vehicle condition representing a state of the vehicle is carried out with a vehicle speed sensor; and if the vehicle speed sensor senses high, then:

deactivating a plurality of spread beams of said forward lighting array.

16. The method as defined in claim 7, wherein said step of sensing at least one vehicle condition representing a state of the vehicle is carried out with a left turn signal; and if the left turn signal is ON, then:
    activating a left spread beam of said forward lighting array.

17. The method as defined in claim 7, wherein said step of sensing at least one vehicle condition representing a state of the vehicle is carried out with a right turn signal; and if the right turn signal is ON, then:
    activating a right spread beam of said forward lighting array.

18. The method as defined in claim 7, wherein said step of sensing at least one environmental condition representing a state of the environment is carried out with a high beam auto dim sensor; and if high beam auto dim sensor senses a predetermined number of transitions in a predetermined time, then:
    deactivating a plurality of high beams of said forward lighting array for a predetermined period of time, unless a high beam stick signal is in an ON position.

19. The method as defined in claim 7, wherein said step of sensing at least one vehicle condition representing a state of the vehicle is carried out with a steering wheel angle sensor; and if the steering wheel angle sensor senses a predetermined number of turns exceeded within a predetermined period of time at slow speeds, then:
    deactivating a plurality of high beams of said forward lighting array for a predetermined period of time, unless a high beam stick signal is in an ON position.

20. The method as defined in claim 7, wherein said step of sensing at least one vehicle condition representing a state of the vehicle is carried out with a steering wheel angle sensor; and if the steering wheel angle sensor senses a predetermined number of turns exceeded within a predetermined period of time, then:
    activating a plurality of spread beams of said forward lighting array for a predetermined period of time.

* * * * *